March 3, 1936.  S. C. WAITS  2,032,821
BICYCLE LOCK
Filed Dec. 2, 1935
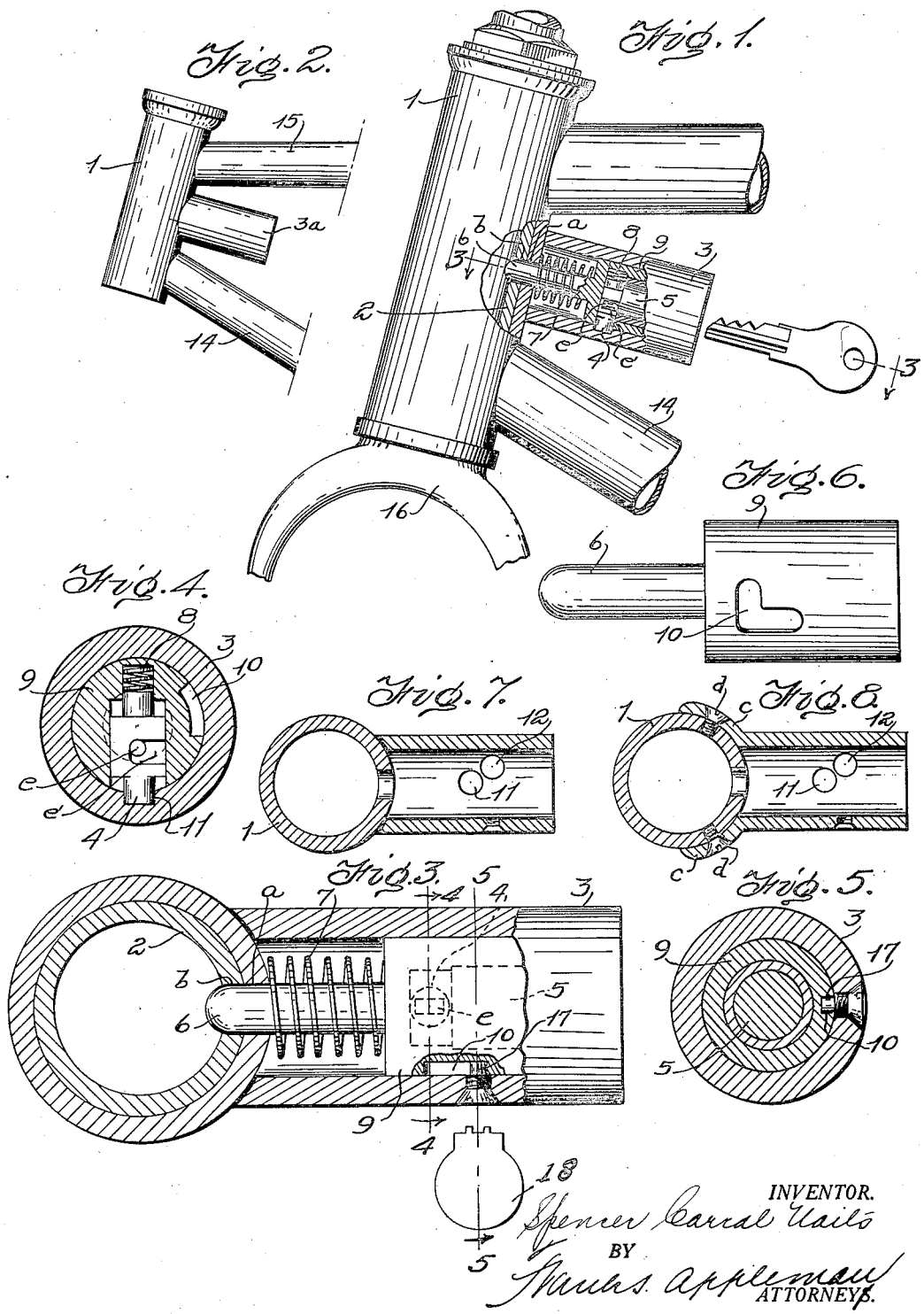
INVENTOR.
Spencer Carral Waits
BY
Thomas Appleman
ATTORNEYS.

Patented Mar. 3, 1936

2,032,821

UNITED STATES PATENT OFFICE 2,032,821

BICYCLE LOCK

Spencer Carral Waits, Monroe, La.

Application December 2, 1935, Serial No. 52,574

4 Claims. (Cl. 70—90)

This invention relates to locks for bicycles and the object of the inventor is to provide novel means to lock the parts of the bicycle in order to prevent the forks from turning. Preferably, the parts are locked so that the forks are in a position that the front wheel of the bicycle is at right angles to the axis of the rear wheel, so that the bicycle can not be rolled without lifting the front wheel clear of the roadbed, in which position it would, of course, have to be pushed or pulled to transport it.

This application is a continuation in part of my application, Serial Number 17,856 filed April 23, 1935.

It is furthermore an object of this invention to provide a novel bracket or lock casing which is carried by the head and it may be secured thereto in any appropriate way as by mechanical fastenings or autogenous welding, in order that it will be a rigid part of the structure containing the aforesaid locking mechanism.

It is furthermore an object of the invention to provide a lock of the character indicated in which the movable parts may be held at different positions of adjustment as when the locking bolt is projected to lock the parts together or when it is retracted to free the parts of its influence.

It is a further object of the invention to provide a lock, the locking bolt of which is held retracted, so that when the mechanism and the detent which holds the locking bolt in locking position is retracted and held retracted, the parts associated with the lock will be movable under the influence of pressure applied to the movable parts to return the detent into position to be forced into the seat where it will again hold the locking bolt in locking position. This arrangement permits the user of the lock to leave it unlocked but readily adjusted to locking position and, as stated, provision is also made as an alternative operation to retain the parts with the bolt in unlocked position and in a condition where the lock cannot be manipulated without releasing the parts that hold it in unlocked condition, that is to say, the lock is held retracted by means which require the operation of a key to release it and permit the bolt to move to locking position.

It is a further object of the invention to hold the parts assembled within the casing, so that they can not be tampered with or impaired.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a view in elevation, partly in section, of a fragment of a bicycle with a lock embodying the invention applied thereto;

Figure 2 illustrates a view in elevation of a part of a bicycle on a reduced scale in which the lock casing is attached to the head of the bicycle in the same manner in which frame members are usually attached to heads of bicycles;

Figure 3 illustrates an enlarged detail sectional view of the lock and its relation to the locked parts of the bicycle, omitting the key;

Figure 4 illustrates a sectional view of the lock on the line 4—4 of Fig. 3;

Figure 5 illustrates a sectional view of the lock on the line 5—5 of Fig. 3;

Figure 6 illustrates an enlarged detail view of a part of the lock carrying a locking bolt;

Figure 7 illustrates a horizontal sectional view of the bicycle head with a lock casing attached thereto as it appears in Fig. 2; and Figure 8 illustrates a sectional view in which the lock casing is secured to the bicycle head by mechanical fastenings.

In the drawing 1 denotes the head of a bicycle and 2 the crown tube therein which are provided with coinciding apertures $a$, $b$. A lock bracket or casing 3 is attached to the head by mechanical fastenings or by welding. A detent 4 is slidable transversely of the tube 9 which is rotatable and movable longitudinally of the casing and the detent is under the influence of a spring 8 which projects it or retains it in the seats or keepers 11 or 12 formed by recessing the inner wall of the lock casing. A locking barrel 5 in the tube has an eccentrically positioned pin $e$ which projects into a slot $e'$ in the detent 4 so that when the locking barrel is turned, the detent will be moved inwardly against the influence of the spring 8. The seats or keepers 11 and 12 are stepped longitudinally and circumferentially of the lock casing and when the tube is forced outwardly under the influence of the spring 7 the detent travels in a line which does not intersect the seat or keeper 12. The detent, therefore, has its end engaging the inner surface of the casing during the movement of the tube longitudinally of the casing. The tube may, however, be turned, as will presently appear, to cause the detent to register with the recess or keeper 12 into which it will then be forced by the spring 8 to lock the parts with the locking bolt in unlocked position.

The locking bolt 6 which projects from the inner face of the tube enters the apertures $a$ and $b$ when the parts are to be locked and the spring 7 on the said locking bolt between the inner end of the tube and the head 1 serves to force the bolt out of the apertures when the said detent is moved out of the recess or keeper 11.

In removing the detent from the recess or keeper 11, the locking barrel is turned to an extent which will cause the detent to clear the wall of the recess or keeper 11 and at which position the spring 7 will force the locking bolt 6 outwardly to release the crown tube from the head. At this stage of the proceeding the detent is out of alinement with the recess or keeper 12 and remains in this position unless the locking tube 9 is turned. If the lock is not to be locked in open position, the key may be removed and then the bolt 6 and the parts which carry it may be forced inwardly by pressure on the tube and the detent 4 will automatically be forced into the recess or keeper 11 when said detent alines with it and again the crown tube and head will be locked together by the bolt. If, however, it is desired to hold the bolt 6 in unlocked position with respect to the head and crown tube and to so hold it that unauthorized persons or those who are not provided with a key can force the tube inwardly to project the locking bolt 6 into position to lock the head and crown tube together, the key can be manipulated to turn the locking barrel to a slight degree which, in practice, is nearly a quarter of a turn to the left, in which position the detent 4 will be in alinement with the recess or keeper 12, and when the said detent is seated in the recess or keeper 12, the lock cannot be manipulated by unauthorized persons or without the use of the key to again partially rotate the locking barrel to withdraw the detent 4 from the recess or keeper 12.

The locking barrel and the key may be of any appropriate type and the inventor does not wish to be limited with respect to this feature.

The cylinder is provided with a slot 10 which, at its inner end, is circumferential and its outer portion is longitudinal of the tube. The inner surface of the bracket is provided with a lug 17 which projects into the said slot and the said lug acts to prevent displacement of the tube from the bracket. The slot 10 affords clearance so that the tube may move longitudinally or circumferentially under the influence of the key and the lock cylinder or the spring 7.

The fork 16 of the bicycle is here illustrated as being parallel to the frame tubes 14 and 15 which of course comprise the usual structural features of a bicycle.

In the modification shown in Figure 2, the lock casing 3ª is secured to the head in the same manner in which the members 14 and 15 are secured to it, while in Figure 8 the lock casing is provided with curved arms $c$ secured to the head by mechanical fastenings such as screws $d$, or rivets may be employed. Even if the screw is provided with a head having slots for receiving a screw driver, the slots will be filled by the enamel or paint finish and it will not be observable to one who would tamper with the lock to effect its removal.

As a structural feature of the lug 17, it may be a part of a screw having a head to be operated by a spanner 18 or other device may be employed. If a spanner is used, the holes in the head of the screw would be filled by the enamel or finishing coat applied to the bracket and the manner of the seating of the screw will be concealed. The use of a screw would of course prompt the removal of the screw by one who knew the structural features of it but to guard against its removal to a greater extent it could of course be in the nature of a rivet. The inventor does not wish to be limited with respect to this mechanical feature.

The operation of the several elements of the locking mechanism has been described in connection with the description of the parts and their relations to other parts so that one skilled in the art will, it is thought, understand the construction and operation of the device.

I claim:

1. In a lock, a casing having recesses longitudinally and circumferentially stepped with relation to each other, a tubular member longitudinally and circumferentially movable in said casing, a locking bolt carried by said tubular member, a suitably operated detent projectable and retractable through the said tubular member and operative to hold the same in different positions of adjustment, the said detent being withdrawn from the inner recess and movable outwardly past the other recess when in unlocked position, means for yieldingly holding the tubular member in the last mentioned position whereby pressure on the outer end of the tubular member will force the said tubular member to locking position whereby the detent may be seated in the recess from which it was last removed.

2. In a lock for bicycles, a lock casing, a tube slidable and partially rotatable in said casing, a locking barrel rotatable in the tube and rotatable independently thereof, a locking bolt carried by the said tube adapted to lock the bicycle, a spring interposed between the tube and a fixed member for retracting the said tube, said casing having internal recesses spaced longitudinally thereof and stepped transversely, a detent transversely movable in said tube and adapted to enter the aforesaid recesses selectively, a spring for projecting said detent outwardly, a locking barrel in said tube having an eccentric pin projecting into the detent, and means for partially rotating the locking barrel, said slidable tube having a longitudinally extending slot and a circumferential extension of said slot, a stud in the casing projecting into the slot for limiting the longitudinal movement of the slidable tube and permitting its rotation whereby the detent is moved into alinement with the circumferentially stepped recesses selectively.

3. In a lock for bicycles, a lock casing, a tube slidable and rotatable in said casing, a locking bolt carried by the said slidable tube, a spring interposed between the tube and a fixed member with relation to which it is movable, said casing having internal recesses spaced longitudinally thereof and stepped transversely thereof, a detent transversely movable in said tube and adapted to enter selectively the aforesaid recesses, a spring for projecting the said detent into one or the other of said recesses, means for retracting the detent against the action of the spring to release the said tube, the said tube being moved outwardly under the impulse of the first mentioned spring, the said tube being rotatable to position the detent for alinement with the recesses respectively, and selective means for rotating the said tube circumferentially of the casing.

4. In a lock for bicycles, a lock casing having a forwardly and a rearwardly located recess longitudinally and circumferentially stepped with relation to each other, a tube slidable and partially rotatable in said casing, a bicycle locking member carried by the said tube, said tube having a transversely disposed recess, a detent slidable in the recess and projecting therefrom into operative relation with the stepped recesses selectively, means for forcing the tube outwardly in the casing, a locking barrel rotatable in the tube and having means for operating the detent transversely of the casing to dislodge it from the stepped recesses, the said detent being engageable in the forwardly located recess when the bicycle is locked and the said tube being moved outwardly under the influence of the spring when the detent is dislodged from the first mentioned recess and the said tube being then free to be forced inwardly again to locking position, the said tube being rotatable to cause the detent to enter the rearwardly located recess when the tube is to be inoperative for movement to the locking position and the said detent being removable by mechanical means from the rearwardly located recess when the tube is to be manipulated for rendering the lock for the bicycle operative, the said lock being held against adjustment to locking position without mechanical means for moving the detent from the second mentioned recess.

SPENCER CARRAL WAITS.